Sept. 18, 1962     S. BOSCIA ETAL     3,054,954

SYSTEM FOR TESTING TRANSISTORS

Filed Oct. 14, 1958

INVENTORS
SALVATORE BOSCIA
EARL R. KREINBERG
BY
Fordyce A. Bothwell
ATTORNEY

United States Patent Office 3,054,954
Patented Sept. 18, 1962

3,054,954
SYSTEM FOR TESTING TRANSISTORS
Salvatore Boscia, East Plymouth Valley, and Earl R. Kreinberg, Graterford, Pa., assignors, by mesne assignments, to Philco Corporation, Philadelphia, Pa., a corporation of Delaware
Filed Oct. 14, 1958, Ser. No. 767,134
6 Claims. (Cl. 324—158)

This invention relates to the testing of transistors, and while the invention is applicable to different modes of testing, it is particularly useful for determination of the voltage level at which a phenomenon comparable to arcing occurs, which would destroy the transistor if it were allowed to prevail even for a short time.

In some uses of transistors the destructive value of the collector current, commonly known as $I_m$, is very important. For example, in class A operation of a transistor output stage of an auto radio receiver, it was found that some transistors would be burned out on strong signal due to the fact that the collector current would reach the $I_m$ value at which a solid state arc occurs.

To avoid such destruction, where transistors are to be employed in any usage which subjects them to possible burnout, it is necessary to test the transistors beforehand to determined whether each transistor is suitable for the purpose to which it is to be applied. In the past, however, the test itself has caused destruction of some transistors. In such testing of a transistor, a test circuit is connected to the emitter and the collector, and increasing collector current is caused to flow in the circuit while at the same time the trace of the collector voltage vs. collector current characteristic is observed on an oscilloscope. In prior practice the operator observed the oscilloscope until it indicated the voltage value at which the collector current increased abruptly. Then the operator quickly reduced the applied voltage to prevent damage to the transistor. However, in many instances the transistor was damaged due to the fact that it was physically impossible for the operator to reduce the applied voltage quickly enough to prevent damage to the transistor.

The persent invention solved the problem by providing a testing system wherein the flow of collector current is automatically terminated quickly enough to prevent damage to the transistor. Moreover, the system provided by this invention is applicable generally to, and facilitates, testing of transistors.

One object of the present invention therefore is to provide a system for testing transistors in which the collector current is automatically terminated according to the purpose and conditions of the test in any instance.

Another object of the invention is to provide a system which is particularly useful for the testing of the $I_m$ characteristic and which is effective in preventing damage to the tested transistors.

Other objects and features of the invention will be apparent from the detailed description to follow.

In the accompanying drawings.

Figure 1:
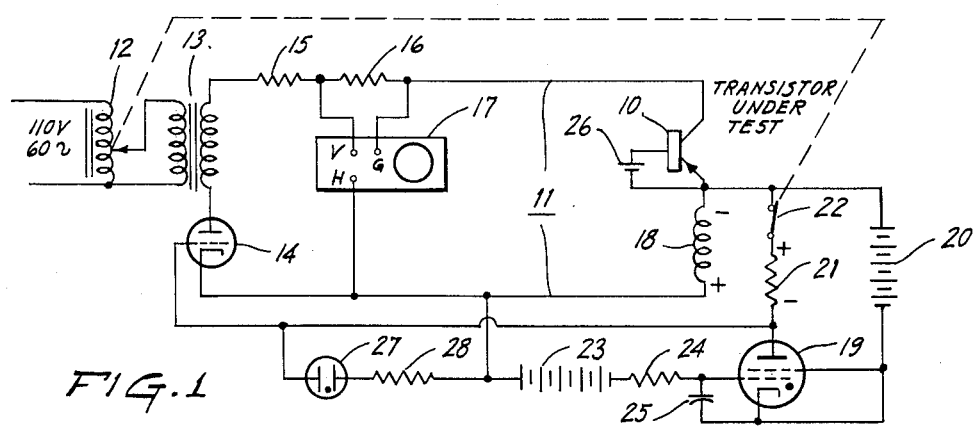
FIG. 1 is a diagrammatic illustration of a transistor testing system according to the preferred embodiment of the invention.

Referring first to FIG. 1, a test transistor is shown at 10 having its emitter and collector connected to a test circuit 11. An adjustable autotransformer 12 supplies an alternating voltage to said circuit through a transformer 13. Included in the circuit is a rectifier tube 14 which may be cut off by the application of a negative voltage to its control grid. By this arrangement, unidirectional collector current is caused to flow through the test transistor, although it will be realized that with a half-wave rectifier as shown the current will be in the form of pulses. While full-wave rectification could be employed, the use of half-wave rectification reduces the duty cycle of the transistor to 50% and thus helps to reduce heating in the transistor.

Resistors 15 and 16 are serially included in the circuit 11, and an oscilloscope 17 is connected as shown so that the horizontal deflection of the oscilloscope beam represents the collector voltage while the vertical deflection of the beam represents the collector current as determined by the voltage drop across resistor 16.

In accordance with the present invention, in order to effect automatic termination of the flow of the collector current as hereinbefore mentioned, there is provided in circuit 11 an impedance element 18, preferably in the form of a small inductor, and there is also provided an arrangement including a thyratron 19 for applying a cut-off voltage to the grid of rectifier 14 in response to a voltage developed across the inductor 18. The thyratron circuit includes the plate voltage supply source 20, plate resistor 21, and switch 22. Voltage source 23 establishes the firing level of the thyratron. The R-C combination 24, 25 determines the firing time.

In carrying out the test of a transistor, the base of the test transistor is preferably established at a low reverse potential as by the source repesrented at 26. The operation of the system to test a transistor is as follows. With the autotransformer 12 initially at its zero position, the operator gradually adjusts it to increase the applied voltage and thus cause increase of the collector current. At the same time, the operator observes the oscilloscope until the current is automatically cut off. This occurs when the voltage across inductor 18 is sufficient to cause the thyratron 19 to fire, and the negative voltage at the plate of the thyratron is applied to the grid of rectifier 14 to cause abrupt termination of the collector current.

The operator then returns the autotransformer 12 to its zero position and resets the thyratron by opening switch 22. If desired, this resetting function may be performed automatically when the autotransformer is returned to zero position, as indicated by the broken line interconnection between the autotransformer and switch 22. Thus the switch may be spring biased to closed position and may be held open by the manual control when the latter is in zero position.

If desired, a neon lamp 27 and a current limiting resistor 28 may be provided as shown, the lamp serving as a visual indicator mainly to indicate resetting of the thyratron, This is particularly desirable where there is no interconnection between switch 22 and autotransformer 12, and an additional manual operation is necessary, i.e. the momentary opening of switch 22. The visual indicator arrangement helps to insure that the thyratron is reset before the testing of the next transistor is started.

Figure 2:
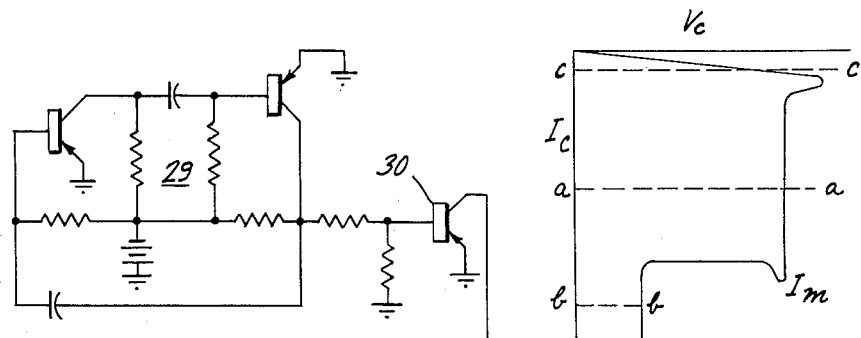
FIG. 2 is an illustration of a typical collector voltage vs. collector current characteristic of a transistor, which will facilitate an understanding of various modes of test as hereinafter described.

The system provided by this invention, as typified by the embodiment of FIG. 1, is adaptable for various modes of testing transistors, as will now be described with the aid of FIG. 2. That figure shows what happens when a transistor under test is permitted to go into $I_m$. As the collector voltage $V_c$ is increased from zero, the collector current $I_c$ increases at a substantially constant low rate until the transistor goes into $I_m$ whereupon the collector current increases abruptly and continues to so increase after an abrupt decrease of the collector voltage. Initially, when the collector current increases at a substantially constant low rate, the voltage across inductor 18 is due solely to the IR drop which increases in proportion to the current increase. However, when the transistor goes into $I_m$ and the collector current increases abruptly, the voltage across inductor 18 also rises abruptly mainly due to the inductive effect of the inductor.

As hereinbefore stated, the system provided by this invention is particularly useful for determination of the voltage at which each test transistor goes into $I_m$, without causing damage to the transistor. Suppose, for example, that the bias voltage at 23 is such that the thyratron will not be fired until the collector current reaches a level such as represented at a—a in FIG. 2. This will insure that with each test transistor the voltage will reach the level at which the transistor goes into $I_m$, but the system will cut off the collector current so abruptly that no damage will be done to the transistor. Yet the operator will be able to see and note the voltage at which the transistor goes into $I_m$. In this way it can be determined whether each test transistor can be operated with a certain range of applied voltage without going into $I_m$.

In some instances, it may be desired to observe the $I_m$ characteristic of a test transistor by making it go into $I_m$. In such case, the bias voltage at 23 may be such that the thyratron will not be fired until the collector current reaches a level such as repsrented at b—b in FIG. 2. Then the system will abruptly terminate the collector current.

In some instances, it may be desired to determine whether each test transistor can be driven to a certain voltage level without going into $I_m$. For example, the bias voltage at 23 may be such that the thyratron will fire when the collector current reaches a level such as represented at c—c in FIG. 2.

Figure 3:
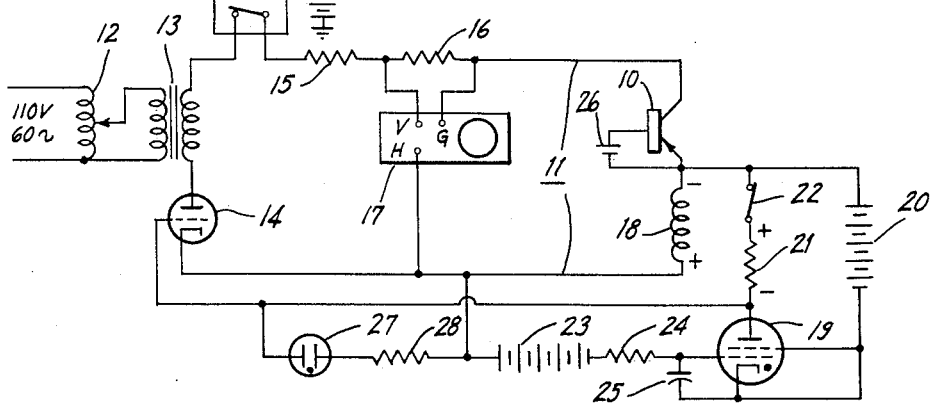
FIG. 3 is a diagramatic illustration of the same system as shown in FIG. 1 with the addition of a pulsing arrangement for reducing the duty cycle of the test transistor.

Referring now to FIG. 3, the same system is shown with the addition of a pulsing arrangement which reduces the duty cycle of the transistor. The pulsing arrangement shown, which is merely exemplary, comprises a transistor multivibrator 29 driving a relay control transistor 30 which in turn operates a mercury relay 31 to intermittently close the circuit 11. By way of example, the pulsing operation may be such that the closed and open times are 50 milliseconds and 950 milliseconds, respectively, in which case the duty cycle is only 5%. Such pulsing operation further protects the transistor against damage.

In one physical embodiment of the testing system which is presently employed, the components are as follows:

| Component | Value |
|---|---|
| Rectifier tube 14 | type 6AS7. |
| Thyratron 19 | type 2D21. |
| Lamp 25 | NE-2. |
| Resistor 15 | 50 ohms. |
| Resistor 16 | 1 ohm. |
| Resistor 21 | 10K. |
| Resistor 24 | 1 megohm. |
| Resistor 28 | 150K. |
| Capacitor 25 | .001 micro-microfarad. |
| Inductor 18 | 16 microhenrys. |
| Voltage source 23 | 90 to 100 volts. |
| Voltage source 20 | 90 volts. |
| Voltage source 26 | 0.5 volt, 10 ohms. |

While a preferred embodiment of the invention has been illustrated and described, it is to be understood that the invention is not limited thereto but contemplates such modifications and further embodiments as may occur to those skilled in the art.

We claim:

1. In a system for testing transistors having an emitter and a collector, a test circuit which in the course of test is connected to the emitter and collector of a test transistor, means for applying an alternating voltage to said circuit, normally-conductive rectifier means included in said circuit so as to produce unidirectional flow of collector current therein, said rectifier means comprising at least one vacuum tube including a control grid to which a negative voltage may be supplied to render said tube non-conductive, means controllable by an operator for gradually increasing the applied alternating voltage to increase said current, an impedance element in said circuit through which said current flows, means for establishing a predetermined voltage level, means responsive only to a voltage developed across said element in excess of said level for applying a negative cut-off voltage to the control grid of said tube to abruptly terminate said current, and visual indicator means connected to said circuit to indicate desired information to the operator.

2. A system according to claim 1, wherein the current terminating means comprises a thyratron triggerable only by a voltage developed across said impedance element in excess of said level.

3. A system for testing transistors while protecting them against damage in the course of test, comprising a test circuit which in the course of test has one side connected to the collector of a test transistor and has its other side connected to the emitter of the test transistor, an electrical source connected to said circuit to apply voltage thereto and produce current flow therein through the emitter-collector path of the test transistor, means manually operable by an operator to increase the applied voltage and thus increase the current flow in said circuit, visual indicator means connected to said circuit to indicate desired information to the operator, a normally-conductive electronic switching device connected in said circuit, a small impedance element connected in said circuit in series with said switching device, a thyratron connected to said impedance element to be fired when the voltage across said element reaches a predetermined value, and a connection between said switching device and said thyratron for rendering said device non-conductive when the thyratron is fired by the voltage across said element.

4. A system according to claim 3, further comprising means operable by return movement of said manual means for interrupting the operation of said thyratron.

5. A system according to claim 3, further comprising means for intermittently closing said circuit to reduce the duty cycle of the test transistor.

6. A system for testing transistors while protecting them against damage in the course of test, comprising a test circuit which in the course of test has one side connected to the collector of a test transistor and has its other side connected to the emitter of the test transistor, an electrical source connected to said circuit to apply voltage thereto and produce current flow therein through the emitter-collector path of the test transistor, means manually operable by an operator to increase the applied voltage and thus increase the current flow in said circuit, visual indicator means connected to said circuit to indicate desired information to the operator, a normally-conductive grid-controlled electron tube connected in said circuit between said source and said emitter, a small impedance element connected in said circuit between said tube and said emitter, a thyratron having a plate resistor connected to the end of said impedance element adjacent to said emitter, a connection between the other end of said impedance element and the control grid of said thyratron.

whereby said thyratron is controllable by the voltage across said impedance element, and a connection between the control grid of said tube and the plate end of said resistor, whereby said tube is rendered non-conductive when said thyratron is fired by the voltage across said impedance element.

References Cited in the file of this patent

UNITED STATES PATENTS

| | | |
|---|---|---|
| 2,815,446 | Coombs | Dec. 3, 1957 |
| 2,841,746 | Mawhinney | July 1, 1958 |
| 2,845,529 | Weldon | July 29, 1958 |
| 2,854,615 | Light | Sept. 30, 1958 |
| 2,925,548 | Scherer | Feb. 16, 1960 |
| 2,938,167 | Hussey | May 24, 1960 |

OTHER REFERENCES

"Obtaining Transistor Characteristic Curves," article in Radio and Television News, September 1953; pp. 66, 67, 130 and 131.

Tellerman "Electronics," April, 1954, pp. 185–187.

"Troubleshooting Data On Selenium Rectifiers," Technican, April 1954; pp. 34–36 and 63.

"Selenium Rectifier Testing," Electronic Technican, February 1957; pp. 32 and 33.